US012591889B2

(12) United States Patent
Kurian et al.

(10) Patent No.: US 12,591,889 B2
(45) Date of Patent: Mar. 31, 2026

(54) BLOCKCHAIN-BASED SOURCE IDENTIFIER

(71) Applicant: Bank of America Corporation, Charlotte, NC (US)

(72) Inventors: Manu Kurian, Dallas, TX (US); Kevin A. Delson, Woodland Hills, CA (US); Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 284 days.

(21) Appl. No.: 17/972,771

(22) Filed: Oct. 25, 2022

(65) Prior Publication Data

US 2024/0135376 A1 Apr. 25, 2024
US 2024/0232879 A9 Jul. 11, 2024

(51) Int. Cl.
*G06Q 20/40* (2012.01)
*G06F 16/23* (2019.01)
*G06F 16/27* (2019.01)
*H04L 9/00* (2022.01)

(52) U.S. Cl.
CPC ....... *G06Q 20/401* (2013.01); *G06F 16/2379* (2019.01); *G06F 16/27* (2019.01); *H04L 9/50* (2022.05); *G06Q 2220/00* (2013.01)

(58) Field of Classification Search
CPC ......... G06F 16/27; G06F 16/2379; H04L 9/50
See application file for complete search history.

(56) References Cited

U.S. PATENT DOCUMENTS

| | | | | |
|---|---|---|---|---|
| 11,120,437 | B2 * | 9/2021 | Wright | H04L 9/321 |
| 2015/0332283 | A1 * | 11/2015 | Witchey | G16H 10/60 |
| | | | | 705/3 |
| 2019/0005195 | A1 * | 1/2019 | Peterson | G16H 10/60 |
| 2019/0278805 | A1 * | 9/2019 | Li | G06F 16/904 |
| 2020/0059510 | A1 * | 2/2020 | Russom | H04L 47/70 |

OTHER PUBLICATIONS

"Blockchain," https://en.wikipedia.org/wiki/Blockchain, Wikimedia Foundation, Inc., Oct. 24, 2022.

* cited by examiner

*Primary Examiner* — John W Hayes
*Assistant Examiner* — Justin Abel Jimenez
(74) *Attorney, Agent, or Firm* — Weiss & Arons LLP

(57) ABSTRACT

Systems for using a digital replication of a series transaction blockchain to identify web resource sources associated with a given transaction. Transactions may include web resources. The web resources may be sourced to web sources. The digital replication may enable tracing and mapping of web resources to their corresponding web sources. Using the digital mapping of web resource sources, a schematic lineage may be created of the web resource sources. The schematic lineage may be used to track web resources, populate lost data points and/or to create a three-dimensional view of the mapping.

5 Claims, 4 Drawing Sheets

BLOCKCHAIN-BASED SOURCE IDENTIFIER

FIELD OF TECHNOLOGY

The field of technology relates to blockchains.

BACKGROUND OF THE DISCLOSURE

Blockchain technology is a rapidly growing field of technology. A blockchain is a type of a distributed ledger. A blockchain may include a growing list of records. The records may be referred to as blocks. The blocks may be securely linked together using cryptography. Each block, in the blockchain, may include a cryptographic hash of the previous block, a timestamp and transaction data. The timestamp may be used to prove that the transaction data existed when the block was created. Because each block includes a cryptographic hash of the previous block, the blocks form a chain. Each additional block may be linked to the previous blocks in the chain.

It should be noted that blockchain transactions may be irreversible. Once a block is recorded and subsequent blocks have been added to the chain, the data included in a single block may be unalterable without also altering all of the subsequent blocks.

Blockchains may be used in a variety of industries. Blockchains may be used to record transactions. At times, transactions, included as blocks in a blockchain, may reference various sources. Because of the large number of sources referenced by a transaction, it may be desirable to create a blockchain-based source identifier. Such a block-based source identifier may trace transactions and associated web resources and web sources within the blockchain.

Furthermore, it would be desirable to provide a system that uses digital replication technology to trace and map the web resources and web sources.

It would be further desirable for the digital replication technology to create a schematic lineage of web resource sources.

It would be further desirable for the digital replication technology to use the schematic lineage to populate lost data points on the blockchain.

It would be yet further desirable for the digital replication technology to create a three-dimensional mapping of web resource sources.

SUMMARY OF THE DISCLOSURE

Systems, apparatus, and methods for creating a blockchain-based source identifier is provided. Methods may include identifying a transaction series blockchain. The transaction series blockchain may be a blockchain that includes a series of blocks. Each block, included on the blockchain, may include a digital record of a transaction.

A transaction may involve any digital transaction. The transaction may involve a single entity. The transaction may involve two or more entities. The transaction may include but is not limited to the purchase of goods, transfer of funds from a first account to a second account or any other suitable digital transaction.

The transaction may be processed at a computing device. The computing device may be a laptop, desktop, mobile device, smart phone, or any other suitable computing device. The computing device may include a hardware processor, hardware memory and/or any other suitable hardware and/or software components.

Once the transaction is initiated at the computing device, the computing device may create a digital record of the transaction. The computing device may also create a block. The block may reference the digital record of the transaction. The block may include a cryptographic hash of a previous block on the blockchain, a timestamp and the digital record of the transaction.

The computing device may be included in a network. The computing device may be included in an edge node network. Computers within the edge node network may involve a distributed ledger.

The computing device may broadcast the block to one or more nodes within the edge node network. The one or more nodes within the network may authenticate the block. The authentication of the block may involve authenticating the digital record of the transaction included in the block. At times, the one or more nodes may authenticate the transaction by solving a proof of work or by completing another suitable form of authentication. Once the block is authenticated by at least a predetermined percentage, or predetermined number, of the nodes included in the edge node network, the block may be added to the existing blockchain. At times, the predetermined percentage may be 20%, 40%, 60%, 80%, 100% or any other predetermined percentage. The predetermined number may be 10, 20, 100 or any other suitable predetermined number of nodes.

The transaction may be executed on the computing device using one or more web resources. Web resources may include but are not limited to, third-party web-based payment applications, backend applications, web-based security verification applications and any suitable website resources. The web resources may be sourced on a web or network. The web may be the World Wide Web, alternatively known as the Internet. The web may be any other suitable web or network.

Methods may include tracing each of the web resources used within a transaction to its corresponding source on the web. Methods may further include building a digital twin of the transaction series blockchain. Building a twin of the transaction series blockchain may involve duplicating the digital system used within the transaction series blockchain. The digital system may include hardware, software and performance metrics. The digital twin may be built using artificial intelligence ("AI"). The AI may be used to replicate the hardware, software, and performance metrics of the digital system. The digital twin may be a virtual representation of the transaction series blockchain.

Methods may further include using a blockchain-based source identifier to create a lineage of web resource sources. The blockchain-based source identifier may identify a first digital record of a first transaction included in a block. The blockchain-based source identifier may trace, using the digital twin, one or more computing resources involved with the transaction. The blockchain-based source identifier may trace the one or more computing resources to a source. The source may be a database, a memory location, a web location and/or any other suitable hardware or software source.

The tracing may include identifying one or more web resources included in the digital record of a first transaction. The tracing may also involve identifying corresponding web sources for the one or more web resources. Tracing may also include mapping the one or more web resources to the corresponding web sources. It should be noted that a web source may be a location in which data is located, while a web resource may be a location that indicates the locations of web sources.

Based on the tracing, the blockchain-based source identifier may create a schematic lineage of web resources and their corresponding sources. The schematic lineage may be specific to the first transaction and/or a specific block within the blockchain. The schematic lineage may be based on the mapping of web resources and corresponding sources as included on the digital twin.

Methods may further include continually tracing web resources to corresponding web sources. The continual tracing may be executed in response to new blocks being added to the blockchain. Continual tracing may involve identifying new blocks added to the blockchain. Upon identification of a new block within the blockchain, methods may include creating a digital twin of the new block. The digital twin of the new block may be added to the digital twin of the transaction series blockchain.

Methods may include continual tracing using the digital twin. The continual tracing may include using a blockchain-based source identifier to continually identify one or more web resources included in the digital record of each of the newly identified blocks. The blockchain-based source identifier may continually identify corresponding web sources for each of the identified web resources.

Methods may include continually mapping, on the digital twin blockchain, the identified web resources to the identified web sources. Methods may also include continually creating, a schematic lineage of corresponding web resource sources. The schematic lineage may be created for each transaction that corresponds to a block within the digital twin blockchain.

Methods may also include using the schematic lineage of web resource sources to create a three-dimensional view of the mapping of the web resources.

At times, a data point within a blockchain is lost. As such, methods may include using the schematic lineage to populate the lost data point. The lost data point may correspond to a discontinued source. Methods may also include using the schematic lineage to notify one or more stakeholders of the transactions that may be affected in the event that a predetermined source is discontinued.

In some embodiments methods, may involve building a digital triplet of the digital system and/or blockchain. Methods may further comprise building a digital quadruplet of the digital system and/or blockchain. Methods may further include building any number of digital replications of the digital system and/or blockchain. The digital twin, triplet, quadruplet and/or any other digital replication may be used to trace web resources to their corresponding web sources. The digital twin, triplet, quadruplet and/or any other digital replication may be used for any other suitable purposes.

In certain embodiments, a user may select a single block on the transaction series blockchain to be replicated on the digital twin. The user may select any desired block on the transaction series blockchain for replication. The user may desire to replicate a single block. The user may desire to replicate multiple blocks.

Methods include enabling a user to replicate any desired block or blocks on a digital triplet. Methods may include enabling a user to replicate any desired block or blocks on a digital quadruplet.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
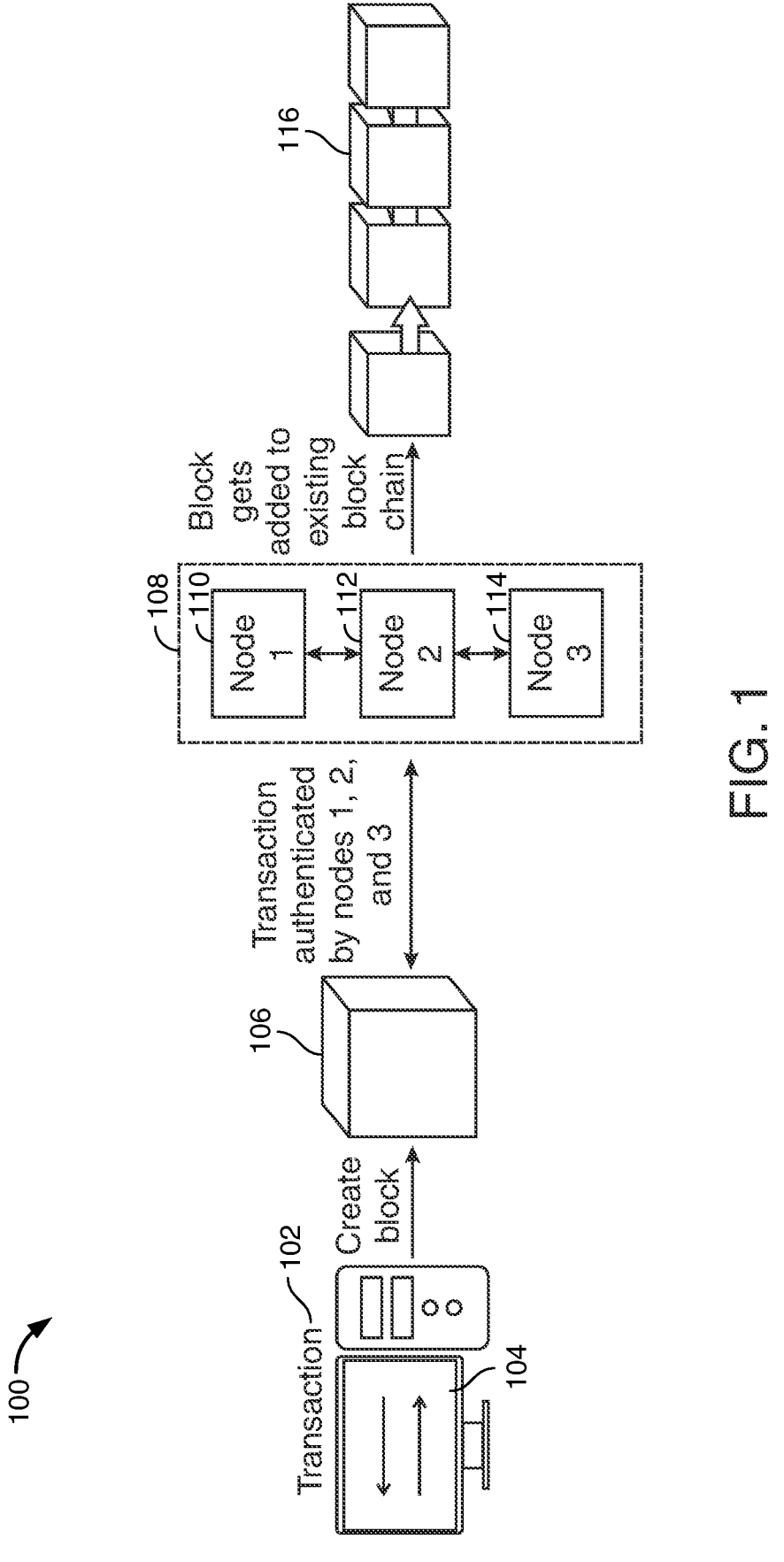
FIG. 1 shows an illustrative diagram in accordance with principles of the invention.

Apparatus, methods, and systems for a blockchain-based source identifier are provided. Apparatus may include a network of nodes. The network of nodes may be an edge node network, a private network, a local area network ("LAN"), a wide area network ("WAN") or any other suitable network.

One or more nodes, included in the network, may be linked to a user computer. Each user computer may a laptop, desktop, mobile device, tablet, smartphone, or any other computing device. Each user computer may be configured to process transactions. Transactions may include exchange of digital information between one or more entities. A transaction may include a transfer of funds, a purchase of goods and/or any other suitable transaction.

Nodes within the network may be permissioned to add blocks to a blockchain. Nodes may be configured to create a digital record of a transaction that was processed at the user computer. Nodes may be configured to create a block that corresponds to the digital record of the transaction. Each block may include the digital record of the transaction. Each block may include one or more web resources. Web resources may include web-based applications, websites and/or any other suitable web-based transaction resources. Web resources may have corresponding sources on a web. The web may be the World Wide Web, alternatively known as the Internet. The web may be any other suitable web and/or network.

A node may broadcast the block to the other nodes included in the network. The nodes, included in the network, may be configured to authenticate the new block by solving a proof of work, or any other suitable authentication method. Once the block is authenticated, the node and/or the network may add the new block to the existing blockchain.

Apparatus may also include an artificial intelligence ("AI") module. The AI module may reside on a hardware processor. The hardware processor may be included on a user computer. The user computer may be part of the node network. The AI module may create a digital twin of the blockchain. The digital twin may be a virtual representation of the blockchain. The digital twin may be built by replicating the hardware, software, performance metrics and/or any other suitable components of the digital system used to create the blockchain.

The AI module may also trace one or more web resources, included within each block, to a source on a web. The AI module may trace the one or more web resources using the digital twin. The AI module may identify one or more web resources linked to a transaction associated with a block. The AI module may identify one or more corresponding sources for each of the one or more identified web resources. The AI module may map, using the digital twin, the one or more identified web resources to the corresponding identified sources.

The AI module may create a schematic lineage of web resource sources using the mapping of the one or more web resources to the one or more corresponding web sources. The semantic lineage may be created using the digital twin.

The AI module may continually trace the one or more web resources upon the execution of new transactions. As new transactions are executed, new blocks may be created for the new transactions. The new blocks may be authenticated and added to the blockchain. The AI module may continually create digital twins of the new blocks, continually trace the one or more web resources to the one or more web sources and continually create schematic lineages of web resource sources.

In the event that a web resource or a web source is lost, the AI module may be configured to populate the lost data point. The AI module may use the schematic lineage and/or the mapping of resource sources to identify and populate missing data points within the blockchain. The AI module may be further configured to use the schematic lineage of resource sources to create a three-dimensional view of the mapping of web resource sources.

In some embodiments, the AI module may be further configured to enable a user to select a single block on the blockchain. The selected block may be replicated on the digital twin. The AI module may enable a user to replicate a specified number of blocks on a digital twin.

In other embodiments, the AI module may be further configured to create a digital triplet of the blockchain. The AI module may enable a user to replicate a specified number of blocks on the digital triplet. The AI module may be configured to create a digital quadruplet of the blockchain. The AI module may be configured to execute any suitable number of digital replications of the blockchain.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative process 100. Illustrative process 100 may show transaction 102. Transaction 102 may be initiated and/or executed at computing device 104. Computing device 104 may be a desktop, laptop, tablet, mobile device, smart phone, or any other suitable computing device.

Transaction 102 may include a transaction that involves a single entity. Transaction 102 may be any suitable transaction between two or more entities. Transaction 102 may be initiated at computing device 104. Transaction 102 may include, but is not limited to, a purchase of an item, a transfer of funds and/or any other suitable transaction. Computing device 104 may be configured to process transaction 102.

Upon initiation of transaction 102 at computing device 104, computing device 104 may create block 106. Block 106 may include a digital record of transaction 102. Block 106 may require authentication from network of edge nodes 108. Network of edge nodes 108 may include individual nodes 110, 112 and 114. Network of edge nodes 108 may include additional nodes (not shown). Transaction 102 may be authenticated by edge node 110, edge node 112 and/or edge node 114. Transaction 112 may be authenticated by substantially all the edge nodes that are included in network of edge nodes 108.

Once block 106 is authenticated by all of, or a portion of, the nodes present in network of edge nodes 108, block 106 may be appended to blockchain 116. Blockchain 116 may be comprised of two or more blocks connected in a chain-like form. Each block, within blockchain 116, may include a digital record of a transaction. Block 106 may be appended onto blockchain 116 at the end of the blockchain—i.e., after all the previous blocks.

Figure 2:
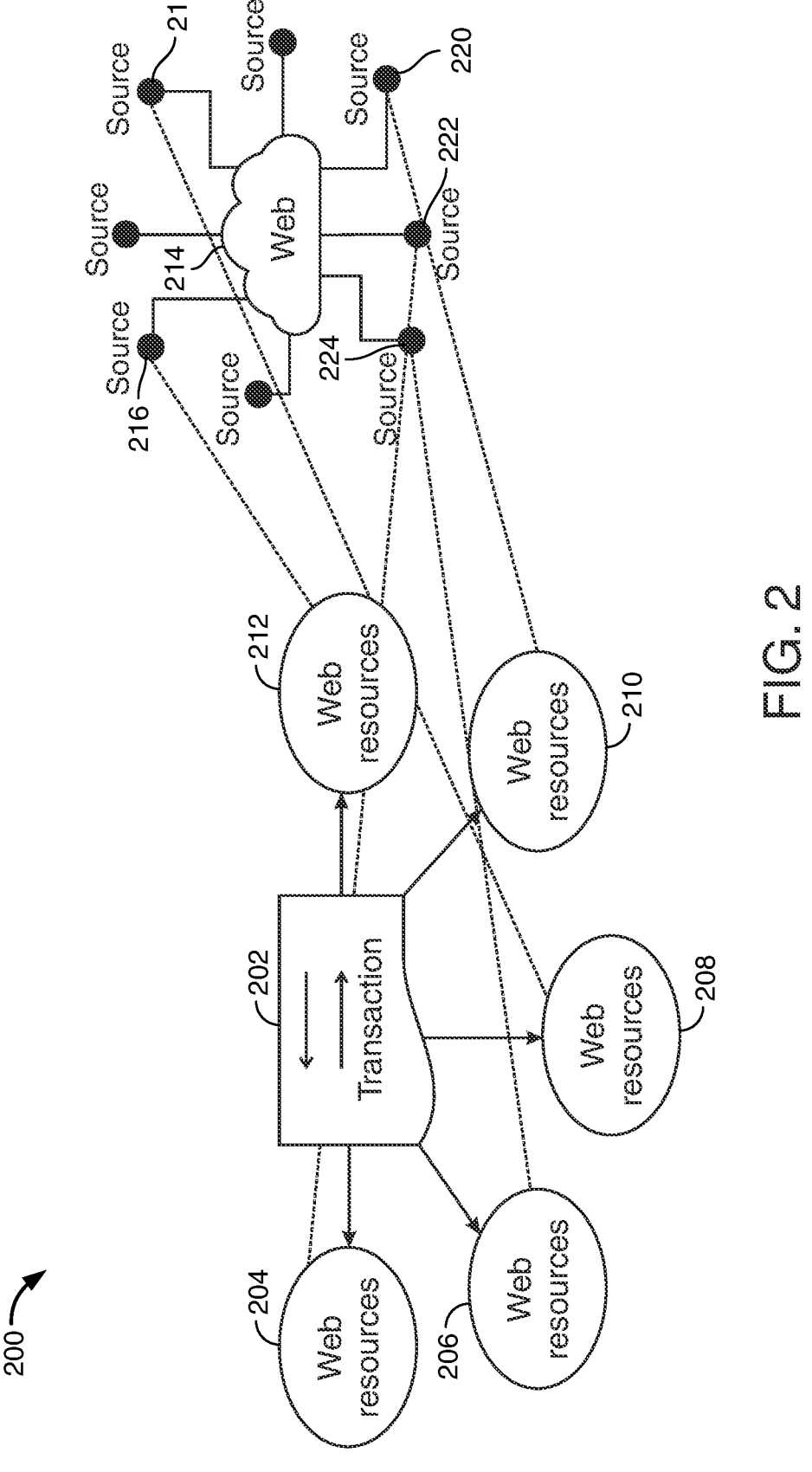
FIG. 2 shows another illustrative diagram in accordance with principles of the invention.

FIG. 2 shows illustrative diagram 200. Illustrative diagram 200 may show transaction 202. Transaction 202 may be any suitable transaction between two or more entities. Transaction 202 may be initiated through a computing device. Transaction 202 may be any suitable transaction within an entity. Transaction 202 may include, but is not limited to, a purchase of an item, a transfer of funds or any other suitable transaction.

Transaction 202 may include one or more web resources. Transaction 202 may include web resource 204, 206, 208, 210 and 212. A web resource may be an index available on a web. A web resource may also be a web address. Each web resource may have a corresponding web source. A web resource may be the storage location of a code library referenced by the index. The corresponding web source may be included on web 214. Web 214 may be an internal network or any external network. Web 214 may be the Internet.

Web resource 204 may be sourced to web source 222. Web resource 206 may be sourced to web source 224. Web resource 208 may be sourced to web source 218. Web resource 210 may be sourced to web source 220. Web resource 212 may be source to web source 216.

Figure 3:
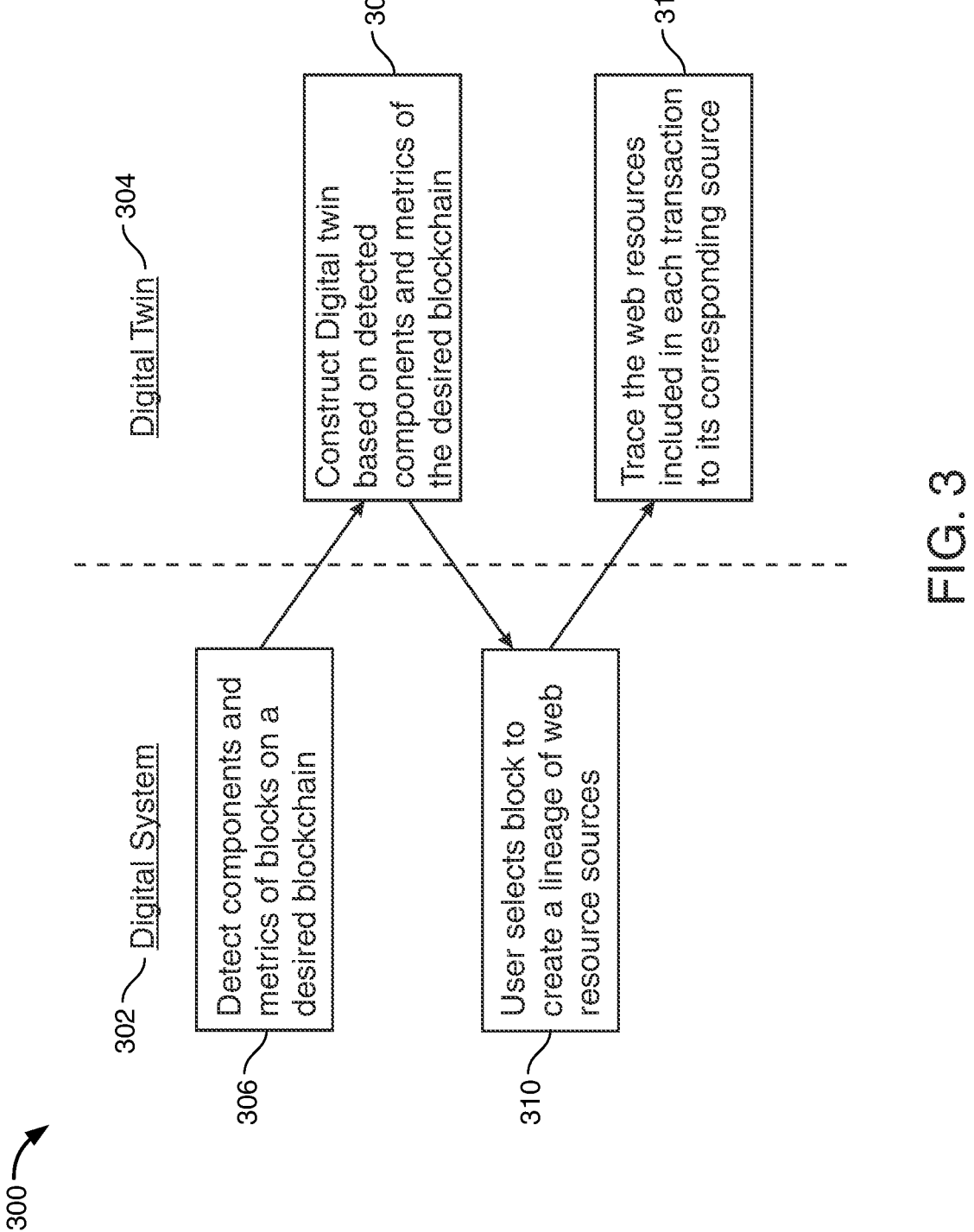
FIG. 3 shows yet another illustrative diagram in accordance with principles of the invention.

FIG. 3 shows illustrative diagram 300. Illustrative diagram 300 shows digital twin 304 being mapped to digital system 302. Digital system 302 may include a blockchain. The blockchain may be comprised of two or more blocks. Each block of the blockchain may include a digital record of a transaction. Each transaction may include one or more web resources. The one or more web resources may be sourced to a corresponding web source. At step 306, digital system 302 may detect the components and metrics of the desired blockchain.

At step 308, digital system 302 may use artificial intelligence ("AI") to create digital twin 304. Digital twin 304 may be a digital twin of the desired blockchain. Digital twin 304 may be virtual representation of the desired blockchain. Digital twin 304 may mirror the components and metrics of the desired blockchain. At step 310, a user, interfacing with digital system 302, may select a specific block to trace a lineage of web resource sources from the transaction included in the selected block. At step 312, digital twin 304 may trace the lineage of web resource sources of the selected block.

Figure 4:
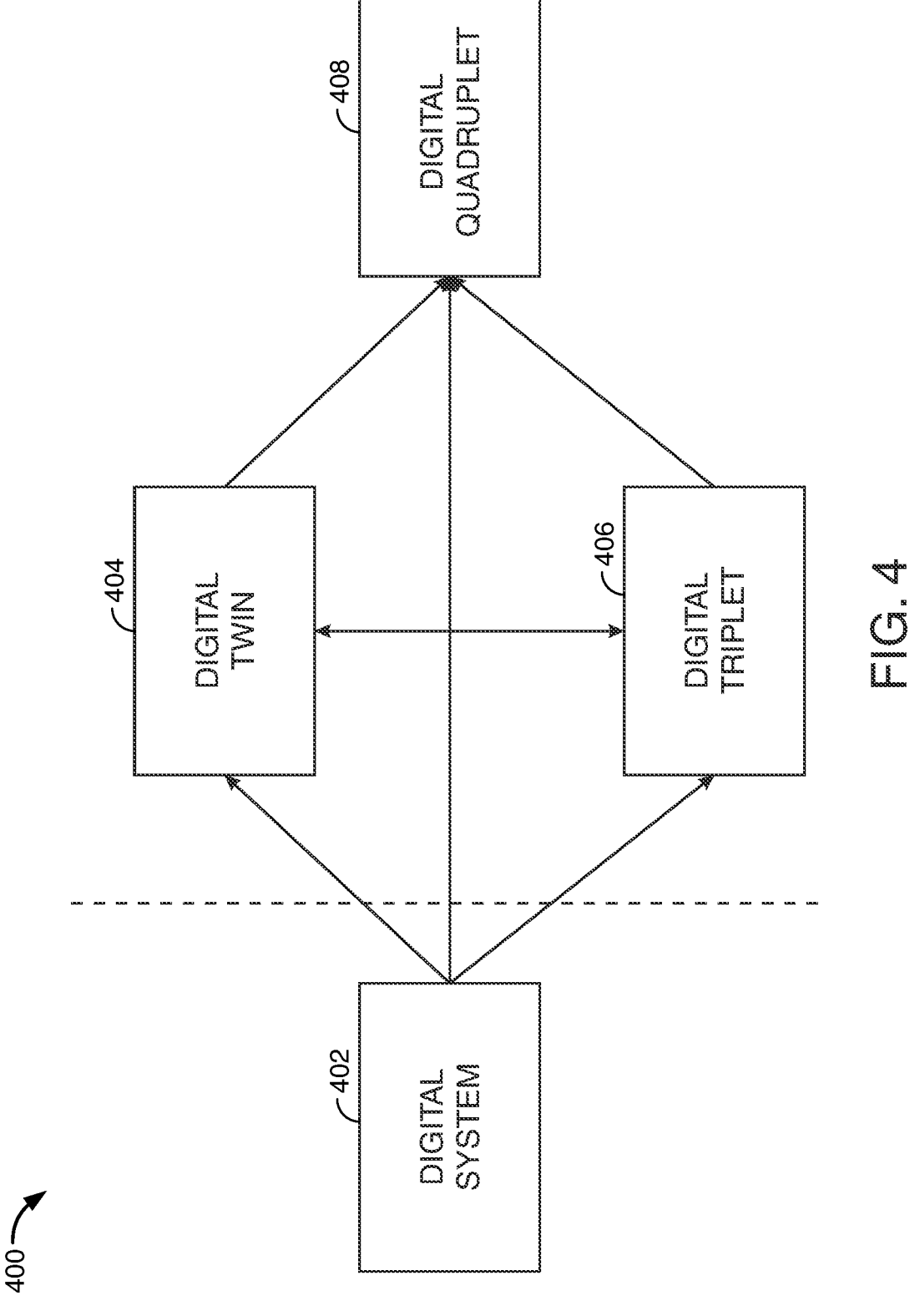
FIG. 4 shows still another illustrative diagram in accordance with principles of the invention.

FIG. 4 shows illustrative diagram 400. Illustrative diagram 400 shows digital system 402. Digital twin 404 may be created to map various components of digital system 402. In addition to digital twin 404, digital triplet 406 may be created. Digital triplet 406 may map digital system 402. Digital triplet 406 may correspond to digital twin 404. Digital quadruplet 408 may also be created to map digital system 402. Digital quadruplet 408 may correspond to digital twin 404, and digital triplet 406.

Thus, methods and apparatus for a BLOCKCHAIN-BASED SOURCE IDENTIFIER are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. An apparatus for capturing, depicting and updating web resource sources included in transactions stored in a blockchain without altering the blockchain, the apparatus comprising a blockchain-based source identifier, said block-chain-based source identifier comprising:

a node included in a network of nodes, the node configured to process transactions, the node being permissioned to access and add blocks to the blockchain, the node configured to:

create a block for a transaction processed, said block comprising:

one or more transaction details; and one or more web resources linked to the transaction;

authenticate the block by solving a proof-of-work authentication to authenticate the transaction processed; and add the authenticated block to the blockchain; and a hardware processor included on the node, said hardware processor configured to create a digital twin of the blockchain, the digital twin being used to create a digital replication of hardware, software and performance metrics of the blockchain, the hardware processor configured to:

trace, in the digital twin, one or more web resources included within the block, to a source, said trace configured to:

using the hardware processor, identify, within the digital twin, one or more web resources linked to the transaction associated with the block;

using the hardware processor, identify, via the Internet, one or more corresponding sources for each of the one or more web resources; and using the hardware processor, map, on the digital twin, the identified web resources to the corresponding identified sources;

create, using the trace, a schematic lineage of the blockchain, said schematic lineage comprising corresponding sources for each block, based on the mapping of the one or more web resources to the one or more corresponding sources; and generate from the schematic lineage, a three-dimensional view of the mapping of the identified web resources to the corresponding identified sources;

wherein the hardware processor is further configured to populate, via the digital twin, a missing data point corresponding to a lost source in response to an identification of a discontinued source.

2. The apparatus of claim 1, the hardware processor further configured to continually trace the one or more web resources as new transactions are occurring.

3. The apparatus of claim 1, the hardware processor further configured to create a digital triplet of the blockchain.

4. The apparatus of claim 3, the hardware processor further configured to enable a user to replicate the block on the digital triplet.

5. The apparatus of claim 1, the hardware processor further configured to create a digital quadruplet of the blockchain.

* * * * *